July 14, 1931.    T. B. FLANAGAN    1,814,591
WEIGHING SCALE
Filed June 5, 1928

Thomas B. Flanagan
INVENTOR.

BY
Edwin P. Conser
ATTORNEY.

Patented July 14, 1931

1,814,591

UNITED STATES PATENT OFFICE

THOMAS B. FLANAGAN, OF COLUMBUS, OHIO, ASSIGNOR TO THE EXACT WEIGHT SCALE COMPANY, OF COLUMBUS, OHIO, A CORPORATION OF OHIO

WEIGHING SCALE

Application filed June 5, 1928. Serial No. 283,019.

My invention relates to weighing scales. It relates, particularly, to a weighing scale that is adapted to use in places where the weighing of commodities is practically continuous.

Heretofore, weighing scales have usually been made with a housing which covers the weight indicating parts disposed in the center of the scale and between the respective weight and commodity pans. The weight indicating housing has also been extended at its bottom, in most instances, to form a covering for the center bearing or bearings of the scale. Also, the weight racks of such weighing scales, if any, have been disposed along the side of the base portion of the scale.

These weighing scale features have been inconvenient in scales used in places where the weighing of packages takes place only at intervals, for instance, in stores, but the weight of each separate package is different from another. Also, these scales have been more or less inconvenient where packages are carried along on a conveyer belt and at some point in the travel thereof each package is taken from the belt and weighed. The fact that the weight indicating mechanism housing is between the pans of the scale necessitates that the operator reach around such housing each time a package is weighed. Furthermore, having the weight rack, if any, along the side of the base portion of the scale and thus out of the usual line of vision of the operator is inconvenient for the operator where the size of packages to be weighed varies to any great extent.

To overcome these inconvenient features, my invention contemplates the provision of a scale in which the weight indicating mechanism is in off-set relation to the weight pans of the scale and which has a center bearing cover that also serves as a weight rack.

Various features of my invention may be seen in the following detailed description and the preferred embodiment of my invention may be seen in the accompanying drawings wherein similar characters designate corresponding parts and wherein.

Figure 1:
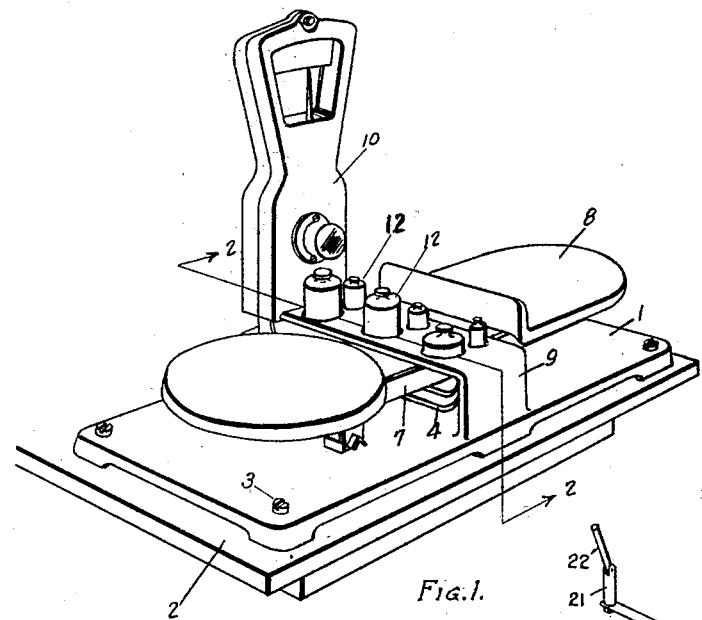
Figure 1 is a perspective view of a weighing scale constructed in accordance with my invention.
Figure 4:
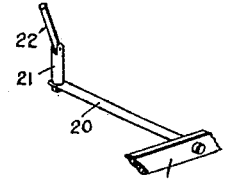
Figure 4 is a detail of the elements connecting the scale beam and pointer.

In the drawings, I have shown a weighing scale comprising a base plate 1 that is mounted on a supporting surface 2. Scale mechanism of the usual type is mounted on this base 1 in the manner hereinafter described.

Figure 2:
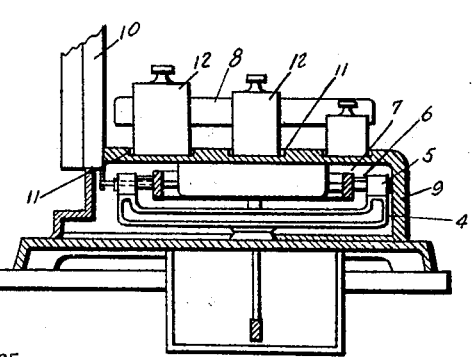
Figure 2 is a sectional view taken on the line 2—2 of Figure 1 with part of the indicating tower removed.

As shown in Figure 2, a yoke 4 extends upwardly from the base and the extreme upper ends of the yoke have bearings 5 therein which are adapted to receive and support knife edge trunnions 6 of the scale beam 7. Such scale beam is preferably what is known in scale parlance as an even balance beam or a beam that is pivotally mounted at its center. As is customary in scale construction, the scale beam 7 has weight pans 8 on the opposing ends thereof.

In the preferred form of my invention I have provided a covering for the center bearings 5 of the scale mechanism which consists of an L-shaped plate 9, which may form an integral part of the base 1. This plate extends vertically upward from one side of the base and then rearwardly across the base to substantially the rear side thereof.

A housing or tower 10 that serves as a covering for the weight indicating mechanism of the scale is shown as being disposed in off-set relation to the central line through the horizontal axis of the respective scale pans or at one side of the base 1. It will be understood that the housing 10 may be of any shape desired and may be inclined from the vertical. It will, also, be understood that the weight indicating mechanism may be of any preferred type and that means are provided for operatively connecting such mechanism with the scale beam so that movements of the beam will be transmitted to the indicator of the mechanism.

Figure 3:
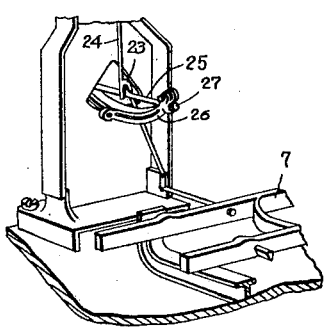
Figure 3 is a detail in perspective illustrating the connection between the scale beam and the indicating pointer.

This mechanism preferably comprises an arm 20 that extends at right angles to the scale beam 7 and is rigidly connected thereto, as shown in Figure 3. The opposing end of this arm is provided with an upstanding bifurcated lug 21 that is adapted to receive one end of a connecting bar 22 that is associated with the pointer. The connection between the connecting element 22 and the lug 20 is preferably of a pivotal nature for a purpose that will be hereinafter apparent.

Likewise, the uppermost end of the connecting element 22 is pivotally secured to a bifurcated member 23 that is formed as a part of the pointer 24. The base of the pointer is designed to be secured to a flat strip resilient element 25, the connection therebetween being such that the pointer is adjustable longitudinally thereof.

The resilient element is preferably mounted in a cast support 26 that is mounted on the face of the indicating tower, as shown in Figure 3. It is desirable that the opposing ends of this resilient member be held rigid, although means are provided for applying longitudinal stress thereto through the medium of a nut 27.

It can readily be seen that rocking of the scale beam on its central pivot, in either direction, will operate to actuate the pointer 24 through the medium of connecting elements 20 and 22.

One end of the plate 9 is preferably attached to the housing or tower 10 and the upper surface of the plate has sockets 11 therein for the reception of weights 12. There may be as many sockets as the plate will accommodate.

Referring to the drawings and the preceding description, it will be seen that I have provided a scale which will be convenient for use in any weighing operation due to the fact that there is no tower or weight indicating mechanism housing directly between the scale pans. With the tower or weight indicating mechanism housing in off-set relation to the scale pans, the weight indicator pointer may be more easily seen.

It will also be apparent that my scale embodies a particularly advantageous feature in that I have provided a scale with the combination of a center bearing cover and a weight rack. Having a weight rack disposed between the pans as shown will place the various weights directly in the operator's line of vision and in a position which will be most convenient for the selection of any desired weight by the operator.

Having thus described my invention, what I claim is:

1. In a weighing scale, an off-set weight indicating mechanism housing and a center bearing cover, said center bearing cover embodying a weight rack.

2. In a weighing scale, a beam, weight pans mounted on the opposing ends of said beam, a weight indicating mechanism and a housing therefor, said weight indicating mechanism and housing being disposed in off-set relation to the line through the horizontal axis of the weight pans, and a center bearing cover which embodies a weight rack.

3. In a weighing scale, a base, weighing mechanism mounted on said base, a weight indicating mechanism off-set from said weighing mechanism and a bearing cover, said bearing cover embodying a weight rack.

4. In a weighing scale, spaced weight pans, a weight rack in between said pans, and an indicating tower at the rear of said weight rack.

5. In a weighing scale, spaced weight pans, a single member comprising a weight rack and a mechanism cover in between said pans, and an indicating tower at the rear of said weight rack.

6. In a weighing scale, spaced weight pans, a single member comprising a weight rack and a mechanism cover below the level of said pans in between said pans, and an indicating tower at the rear of said weight rack.

In testimony whereof I hereby affix my signature.

THOMAS B. FLANAGAN.